(12) United States Patent
Bjorn

(10) Patent No.: US 7,895,432 B2
(45) Date of Patent: *Feb. 22, 2011

(54) METHOD AND APPARATUS FOR USING A THIRD PARTY AUTHENTICATION SERVER

(75) Inventor: Vance C. Bjorn, Redwood City, CA (US)

(73) Assignee: DigitalPersona, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/185,802

(22) Filed: Aug. 4, 2008

(65) Prior Publication Data

US 2009/0031125 A1    Jan. 29, 2009

Related U.S. Application Data

(63) Continuation of application No. 09/707,417, filed on Nov. 6, 2000, now Pat. No. 7,409,543, which is a continuation-in-part of application No. 09/538,926, filed on Mar. 30, 2000.

(51) Int. Cl.
| | |
|---|---|
| *H04L 29/06* | (2006.01) |
| *H04L 9/32* | (2006.01) |
| *H04L 9/30* | (2006.01) |
| *H04L 9/08* | (2006.01) |
| *H04L 9/00* | (2006.01) |
| *G06F 21/00* | (2006.01) |
| *G06F 7/04* | (2006.01) |
| *H04K 1/00* | (2006.01) |

(52) U.S. Cl. .................. 713/155; 713/168; 713/171; 713/179; 713/185; 380/30; 380/255; 380/259; 380/281; 380/285; 726/4; 726/5; 726/26; 726/27

(58) Field of Classification Search ................. 713/155, 713/168, 171, 179, 185; 380/30, 255, 259, 380/281, 285; 726/4, 5, 26, 27
See application file for complete search history.

(56) References Cited

U.S. PATENT DOCUMENTS 5,239,294 A * 8/1993 Flanders et al. ............ 340/5.74

(Continued)

FOREIGN PATENT DOCUMENTS

EP    001 265 121 A2    11/2002

(Continued)

OTHER PUBLICATIONS

Poh, et al., A Multi-Sample Multi-Source Model for Biometric Authentication, 2002, IEEE, pp. 375-384.

(Continued)

*Primary Examiner*—Aravind K Moorthy
(74) *Attorney, Agent, or Firm*—Blakely, Sokoloff, Taylor & Zafman, LLP; Judith A. Szepesi

(57) ABSTRACT

A method and apparatus for a third party authentication server is described. The method includes receiving a record ID for a user, and a one-time key generated by the server and encrypted with a user's public key by the server. The method further includes receiving the user's authentication data from the client, and determining if the user's authentication data matches the record ID. If the authentication data matches the record ID, decrypting the one-time key with the user's private key, and returning the decrypted one-time key to the client.

20 Claims, 8 Drawing Sheets

U.S. PATENT DOCUMENTS

| | | | |
|---|---|---|---|
| 5,534,855 | A | 7/1996 | Shockley et al. |
| 5,535,276 | A | 7/1996 | Ganesan |
| 5,692,106 | A | 11/1997 | Towers et al. |
| 5,748,735 | A | 5/1998 | Ganesan |
| 5,825,884 | A | 10/1998 | Zdepski et al. |
| 5,838,792 | A | 11/1998 | Ganesan |
| 5,867,578 | A | 2/1999 | Brickell et al. |
| 5,930,804 | A | 7/1999 | Yu et al. |
| 5,956,400 | A * | 9/1999 | Chaum et al. ............... 713/167 |
| 6,006,334 | A | 12/1999 | Nguyen et al. |
| 6,012,039 | A | 1/2000 | Hoffman et al. |
| 6,016,476 | A | 1/2000 | Maes et al. |
| 6,023,510 | A * | 2/2000 | Epstein ........................ 705/74 |
| 6,105,010 | A | 8/2000 | Musgrave |
| 6,119,227 | A | 9/2000 | Mao |
| 6,151,676 | A | 11/2000 | Cuccia et al. |
| 6,167,518 | A | 12/2000 | Padgett et al. |
| 6,202,151 | B1 | 3/2001 | Musgrave et al. |
| 6,213,391 | B1 | 4/2001 | Lewis |
| 6,216,116 | B1 * | 4/2001 | Barkan et al. ................. 705/76 |
| 6,233,685 | B1 | 5/2001 | Smith et al. |
| 6,256,737 | B1 | 7/2001 | Bianco et al. |
| 6,260,024 | B1 * | 7/2001 | Shkedy ........................ 705/37 |
| 6,263,438 | B1 | 7/2001 | Walker et al. |
| 6,310,966 | B1 | 10/2001 | Dulude et al. |
| 6,321,339 | B1 | 11/2001 | French et al. |
| 6,434,561 | B1 | 8/2002 | Durst et al. |
| 6,507,912 | B1 | 1/2003 | Matyas, Jr. et al. |
| 6,539,364 | B2 * | 3/2003 | Moribatake et al. ........... 705/69 |
| 6,553,494 | B1 | 4/2003 | Glass |
| 6,581,161 | B1 | 6/2003 | Byford |
| 6,587,946 | B1 | 7/2003 | Jakobsson |
| 6,594,376 | B2 | 7/2003 | Hoffman et al. |
| 6,609,198 | B1 | 8/2003 | Wood et al. |
| 6,636,975 | B1 | 10/2003 | Khidekel et al. |
| 6,668,322 | B1 | 12/2003 | Wood et al. |
| 6,691,232 | B1 | 2/2004 | Wood et al. |
| 6,697,947 | B1 | 2/2004 | Matyas et al. |
| 6,704,872 | B1 * | 3/2004 | Okada ........................ 713/194 |
| 6,853,988 | B1 | 2/2005 | Dickinson et al. |
| 6,959,281 | B1 * | 10/2005 | Freeling et al. ................. 705/10 |
| 7,003,667 | B1 * | 2/2006 | Slick et al. ................... 713/182 |
| 7,020,778 | B1 * | 3/2006 | Miettinen et al. ........... 713/182 |
| 7,085,931 | B1 | 8/2006 | Smith et al. |
| 7,107,447 | B2 | 9/2006 | Sanin et al. |
| 7,111,172 | B1 | 9/2006 | Duane et al. |
| 7,111,173 | B1 * | 9/2006 | Scheidt ........................ 713/186 |
| 7,346,718 | B2 * | 3/2008 | Sakamura et al. ........... 710/106 |
| 7,409,552 | B2 * | 8/2008 | Buttyan et al. ............. 713/172 |
| 7,424,615 | B1 * | 9/2008 | Jalbert et al. ................. 713/171 |
| 2001/0034836 | A1 | 10/2001 | Matsumoto et al. |
| 2001/0050990 | A1 | 12/2001 | Sudia |
| 2002/0002678 | A1 | 1/2002 | Chow et al. |
| 2002/0049681 | A1 | 4/2002 | Herreweghen |
| 2002/0107804 | A1 | 8/2002 | Kravitz |
| 2003/0115324 | A1 * | 6/2003 | Blumenau et al. ........... 709/225 |
| 2003/0172090 | A1 | 9/2003 | Asunmaa et al. |
| 2003/0190046 | A1 | 10/2003 | Kamerman et al. |

FOREIGN PATENT DOCUMENTS

| | | |
|---|---|---|
| EP | 001768304 A1 | 3/2007 |
| JP | 09-081519 | 3/1977 |
| JP | S52-67501 | 6/1977 |
| JP | 09-120293 | 5/1997 |
| JP | 224236 | 8/1999 |
| WO | WO 98/26385 | 6/1998 |
| WO | WO 98/50875 | 11/1998 |
| WO | WO 99/26188 | 5/1999 |
| WO | WO 2005057384 A1 | 6/2005 |
| WO | WO 2006000990 A2 | 1/2006 |

OTHER PUBLICATIONS

Kelly, John, State-of-the-Art: Tech's Moving Target, Oct. 2003, GlobeSt.com, p. 1.

Laili, et al., "Secured Network Authentication Using Biometrics Application," 2002, IEEE, pp. 368-370.

Rosch, Winn, "Passport Security To Go High-Tech A Chip Will Store Your Physical Characteristics," Aug. 2003, The Plain Dealer, pp. 1-3.

* cited by examiner

METHOD AND APPARATUS FOR USING A THIRD PARTY AUTHENTICATION SERVER

The present patent application is a Continuation of U.S. application Ser. No. 09/707,417, filed on Nov. 6, 2000 now U.S. Pat No. 7,409,543, which is a Continuation-in-Part of U.S. application Ser. No. 09/538,926, filed on Mar. 30, 2000.

FIELD OF THE INVENTION

The present invention relates to client-server technology, and more specifically, to using a third party authentication server.

BACKGROUND

As more and more information is moving into electronic form, encryption is becoming more common. One prior art method of encryption is public key encryption—an encryption scheme in which each person gets a pair of keys, called the public key and the private key. Each person's public key is published while the private key is kept secret. Messages are encrypted using the intended recipient's public key and can only be decrypted using the recipient's private key. Messages are signed using the sender's public key and can only be decrypted using the sender's public key. The need for sender and receiver to share secret information (keys) via some secure channel is eliminated—all communications involve only public keys, and no private key needs to be transmitted or shared. Public-key cryptography can be used for authentication (digital signatures) as well as for privacy (encryption). Other encryption schemes, such as symmetric key encryption rely on an exchange of keys.

FIG. 1 is a diagram of a prior art network. The client 110 connects to a server 130 through network 140. A certification authority 150 provides a private/public key pair for the user. The certification authority 150 further provides certificate 115 to the client. The certificate 115 is a copy of the user's public key, signed by the certification authority 150, to prove its authenticity. The certificate 115 and the user's private key 120 are stored on the client system 110. Private keys generally are 64 bit numbers or larger and users do not memorize their keys. Because computer systems are rarely truly secure, the key may be taken from a computer system. In order to prevent this, the key may be stored in a password-protected file. However, passwords may be broken. Additionally, the system is only as secure as the least secure level. For one embodiment, the user types in the password 125, to release the private key 120, so the user can use the private key.

Furthermore, generally the keys are stored on a computer system, and are thus connected to the computer system, rather than an actual user. In the prior art, a user could pass to an impostor his or her password, accidentally or on purpose, and that impostor could then "prove" that he or she was the user.

Furthermore, because each user's private key is stored on his or her computer system, administering the keys is difficult.

In addition, a single mistake, i.e. accidentally granting access to an unauthorized user, permanently breaches the security of the private-public key pair, since the private key is revealed.

SUMMARY OF THE INVENTION

A method and apparatus for a third party authentication server is described. The method includes receiving a record ID for a user, and a one-time key generated by the server and encrypted with a user's public key by the server. The method further includes receiving the user's authentication data from the client, and determining if the user's authentication data matches the record ID. If the authentication data matches the record ID, decrypting the one-time key with the user's private key, and returning the decrypted one-time key to the client.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a third party authentication server is described. The authentication server described herein enables web services to provide a third party authentication option to their users. For one embodiment, this authentication relies on biometrics. For one embodiment, users use a fingerprint sensor, install it on their system, and within minutes register their fingerprint to access web sites. Many institutions, including banking, financial, healthcare, corporate, and government Intranets and Extranets can benefit from this secure and convenient user authentication mechanism. The system may further be used to unlock a smart card or other secured system. This system is transparent to the user, maintains user privacy, ensures the utmost security of the process, and makes the service very easy to deploy and administer by web services and their customers.

Figure 1:
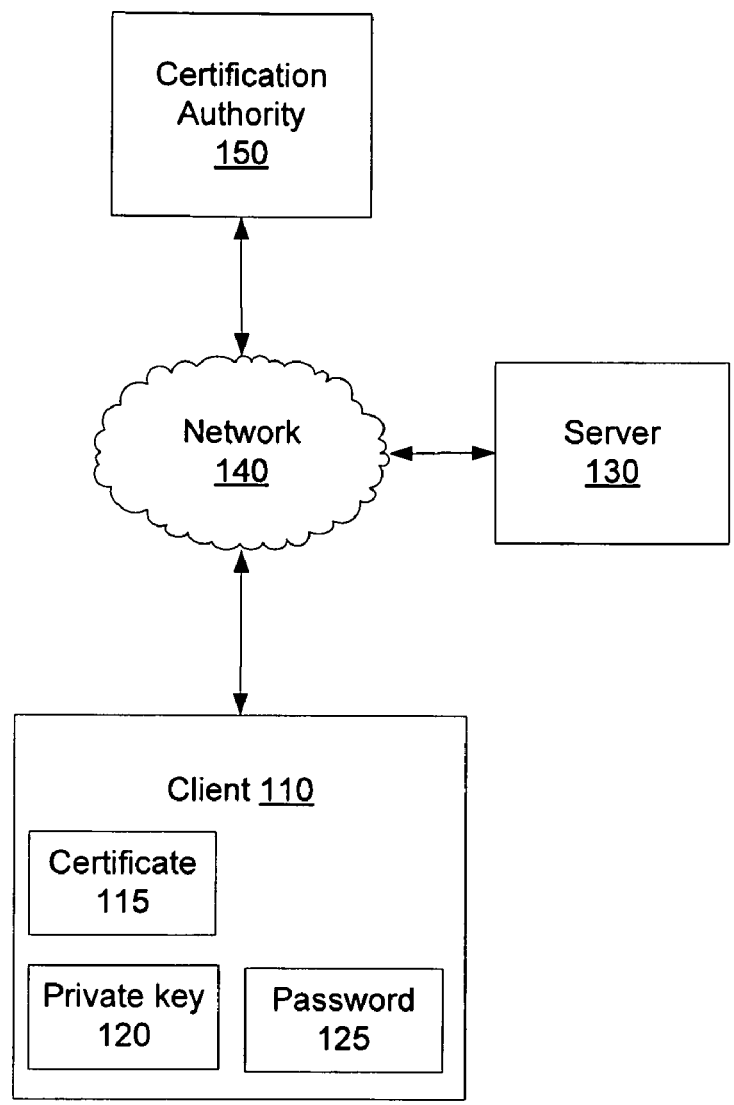
FIG. 1 is a network diagram of a prior art secured access mechanism.
Figure 2:
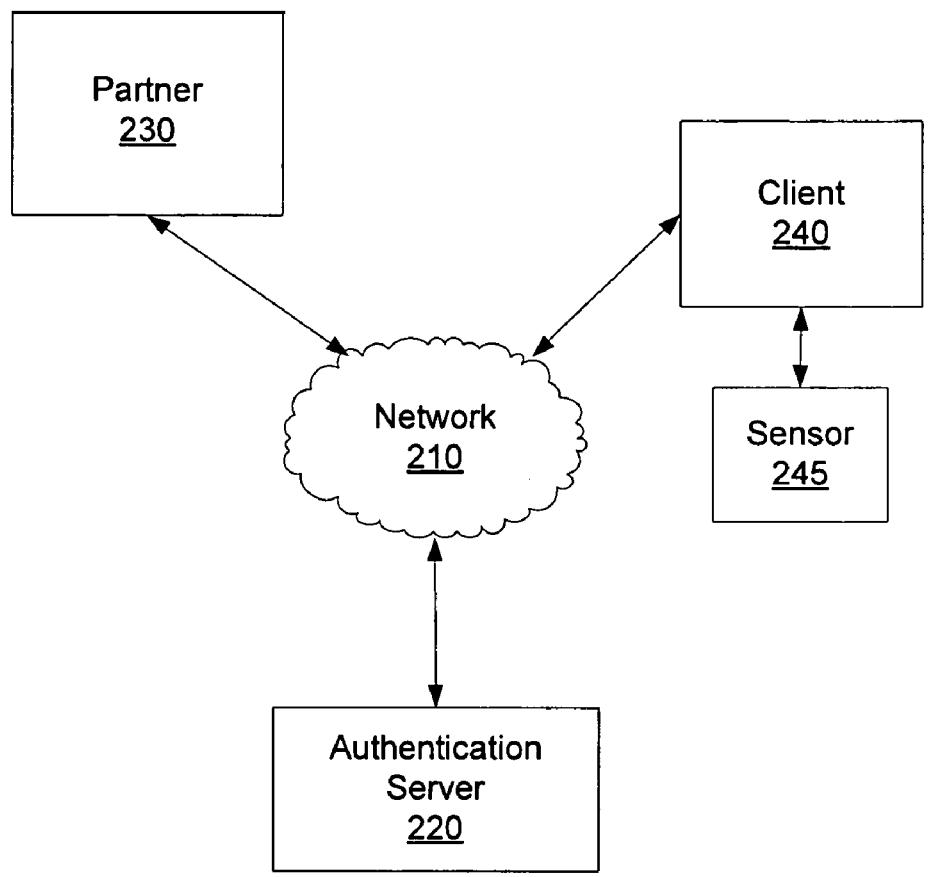
FIG. 2 is one embodiment of a network on which the present invention may be implemented.

FIG. 2 is a block diagram of one embodiment of a network including authentication system. A client 210 is connected to a server 240 through a network 230. If the client 210 wants to log into a secure site on the server 240, the client is prompted by the server 240 to enter the authentication data. This data is sent to the authentication server 220 by the client 210, along with a record ID associated with the particular secure site to which the user is attempting to connect.

For one embodiment, the authentication data is biometric data. In that case, the client system 210 includes a biometric sensor 245. When the user places his or her fingerprint, or other biometric area, over the sensor 245, data is captured. The biometric authentication information is then sent to the authentication server 220.

The authentication server 220 then uses the record ID to determine whether the authentication data matches the registered user. If the user is successfully authenticated, the requested cryptographic function is provided by the authentication server 220. For one embodiment, this cryptographic function is to decrypt a one-time key, provided by server 240, to verify that the user has been successfully authenticated.

For one embodiment, the network 210 may be the Internet. Alternatively, the network 210 may be a local area network (LAN), wide area network (WAN), or another type of network. For one embodiment, the authentication server 220 may be located within the corporation, or the same LAN, or WAN. Thus, a company may install its own authentication server 220, to simplify internal key management.

For another embodiment, the client 210 and authentication server 220 may be on the same computer system. The client 210 may invoke the authentication server 220 when logging on to a server 230 that requires authentication, or whenever cryptographic authentication is needed.

Figure 3:
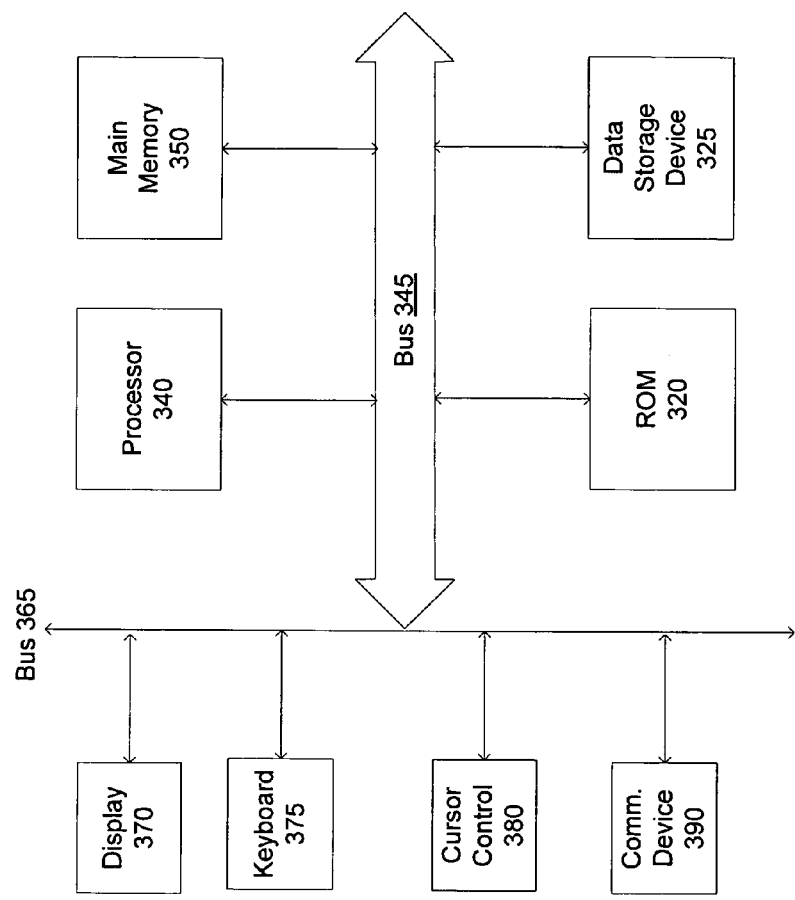
FIG. 3 is a block diagram of one embodiment of a computer system that may be used in conjunction with the present invention.

FIG. 3 is one embodiment of computer system that may be used with the present invention. It will be apparent to those of ordinary skill in the art, however that other alternative systems of various system architectures may also be used.

The data processing system illustrated in FIG. 3 includes a bus or other internal communication means 345 for communicating information, and a processor 340 coupled to the bus 345 for processing information. The system further comprises a random access memory (RAM) or other volatile storage device 350 (referred to as memory), coupled to bus 345 for storing information instructions to be executed by processor 340. Main memory 350 also may be used for storing temporary variables or other intermediate information during execution of instructions by processor 340. The system also comprises a read only memory (ROM) and/or static storage device 320 coupled to bus 340 for storing static information and instructions for processor 340, and a data storage device 325 such as a magnetic disk or optical disk and its corresponding disk drive. Data storage device 325 is coupled to bus 345 for storing information and instructions.

The system may further be coupled to a display device 370, such as a cathode ray tube (CRT) or a liquid crystal display (LCD) coupled to bus 345 through bus 365 for displaying information to a computer user. An alphanumeric input device 375, including alphanumeric and other keys, may also be coupled to bus 345 through bus 365 for communicating information and command selections to processor 340. An additional user input device is cursor control device 380, such as a mouse, a trackball, stylus, or cursor direction keys coupled to bus 345 through bus 365 for communicating direction information and command selections to processor 340, and for controlling cursor movement on display device 370.

Another device, which may optionally be coupled to computer system 330, is a communication device 390 for accessing other nodes of a distributed system via a network. The communication device 390 may include any of a number of commercially available networking peripheral devices such as those used for coupling to an Ethernet, token ring, Internet, or wide area network. Note that any or all of the components of this system illustrated in FIG. 3 and associated hardware may be used in various embodiments of the present invention.

It will be appreciated by those of ordinary skill in the art that any configuration of the system may be used for various purposes according to the particular implementation. The control logic or software implementing the present invention can be stored in main memory 350, mass storage device 325, or other storage medium locally or remotely accessible to processor 340. Other storage media may include floppy disks, memory cards, flash memory, or CD-ROM drives.

It will be apparent to those of ordinary skill in the art that the methods and processes described herein can be implemented as software stored in main memory 350 or read only memory 320 and executed by processor 340. This control logic or software may also be resident on an article of manufacture comprising a computer readable medium having computer readable program code embodied therein and being readable by the mass storage device 325 and for causing the processor 340 to operate in accordance with the methods and teachings herein.

The software of the present invention may also be embodied in a handheld or portable device containing a subset of the computer hardware components described above. For example, the handheld device may be configured to contain only the bus 345, the processor 340, and memory 350 and/or 325. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 4:
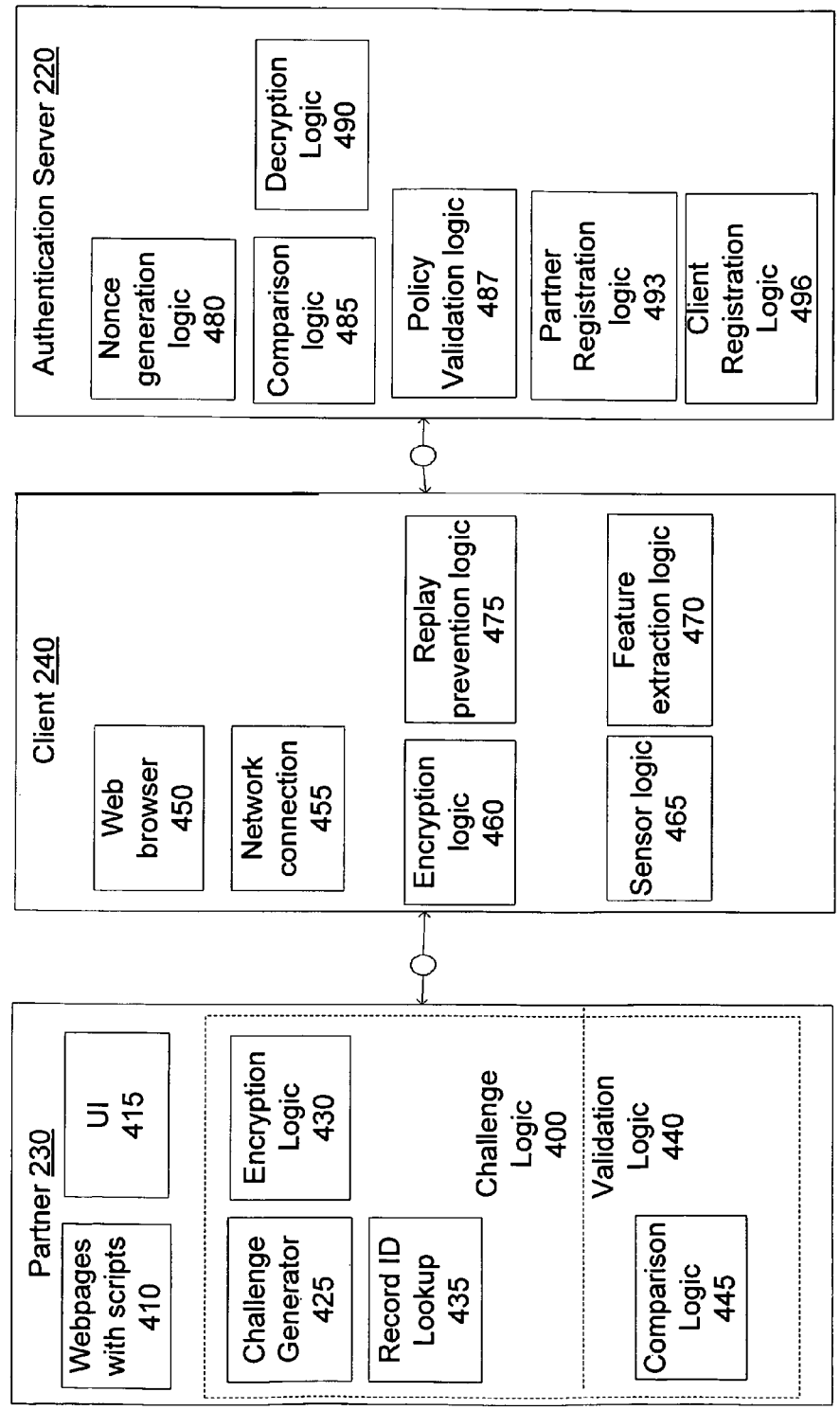
FIG. 4 is a block diagram of one embodiment of a partner site, a client, and an authentication server.

FIG. 4 is a block diagram of one embodiment of a partner site, a client, and an authentication server. The partner 230, client 240, and authentication server 220 are coupled through networks. For one embodiment, these connections are secure connections.

The client 240 includes a web browser 450 and a network connection 455. The client 240 uses this web browser 450 to receive certain prompts from the partner 230 and the authentication server 220, as will be described below. The client 240 further includes a sensor logic 465, which interfaces with a sensor (not shown) coupled to the client 240. The sensor logic 465 receives an image, such as a biometric image, from the user. For one embodiment, another logic to receive a smart card, to alternative authentication mechanism may also be attached to the client's system.

The client 240 further includes feature extraction logic 470, to extract the features from the biometric data received by sensor logic 470. For another embodiment, the feature extraction logic 470 may be located on the authentication server 220. In that instance, the client 240 sends the actual biometrics, rather than the biometric template extracted from the image.

For one embodiment, the biometric data may be encrypted by the sensor itself. For one embodiment, a challenge response may be used to protect the biometric data.

The replay prevention logic 475 incorporates a nonce, received from the authentication server 220 into the biometric image or the biometric template. The nonce is a one-time number, such as a random number or a number that incorporates data such as the time/date, user IP address, etc. that uniquely identifies the current session. This prevents the reuse of the image/template captured in this session, to establish another secure session.

The encryption logic 460 encrypts communications with the partner 230 and authentication server 220. The encryption logic 460 may also be used to establish secure sessions between the partner 230 and client 240, and between the client 240 and authentication server 220.

The partner 230 includes web pages and scripts 410, which may be displayed to the client 240, using the client's web browser 450. The partner 230 further includes a user interface 415 that is used to interface with the partner 230, to program the partner 230, or to present images/scripts/data to the client 240.

The partner 230 further includes challenge logic 420 to create a challenge, and validation logic 440 to determine whether the third party authentication was successful.

The challenge logic 420, in response to receiving an authentication request, indicating that the user is registered with the authentication server 220, looks up the user's client ID, using the record ID lookup 435. The challenge logic 420 also determines whether additional authentication data is needed from the user, based on the policy associated with the record ID. If the partner site handles additional authentication, such as a password, the challenge logic 420 requests the password, and validates it, prior to passing the record ID to the challenge generator 425.

The challenge generator 425 generates a challenge to be decrypted by the third party authenticator. For one embodiment, the challenge generator 425 generates a long random number, which is encrypted by encryption logic 430, using the public key of the particular user who is about to be authenticated. For one embodiment, the record ID and the challenge are encrypted together. For one embodiment, the policy of the partner is also encrypted with the challenge. This policy may require additional authentication, administered by the authentication server. For example, the policy may require additional biometrics, or a password, administered by the authentication server.

For one embodiment, encryption logic 430 further encrypts the data with the partner key of authentication server 220, to verify that the authentication server 220 used is the "real" authentication server 220. For one embodiment, the partner key is a symmetric key that is passed to the partner 230 when the partner initially registers with the authentication server 220. This registration process is described below. For another embodiment, the partner key may be the public key of the authentication server 220.

The encrypted challenge is then sent out by the partner 230, and a response is awaited. When the response is received, the partner, using the comparison logic 445 determines whether the decrypted challenge received is the actual challenge generated by the challenge generator 425. For one embodiment, the decrypted challenge is actually encrypted with the partner key. This partner key may be the same symmetric key as was used by the partner 230, a different symmetric key, or the public key of the partner 230. If the comparison logic 445 determines that the challenge has been successfully decrypted, e.g. the private key of the user has been used, the authentication is accepted, and the client 240 is permitted access to the partner 230.

The authentication server 220, which enables this validation process, includes nonce generation logic 480, which generates the nonce used by the client 240 to return the biometric data to the authentication server 220. The nonce, for one embodiment, is a random number.

The authentication server 220 further includes a biometric data comparison logic 485, which compares the biometric data received from the client 240 with the biometric data associated with the particular user. For one embodiment, the user is identified based on the record ID. For one embodiment, the biometric data comparison logic 485 compares two templates. For another embodiment, the biometric data comparison logic 485 further includes a feature extraction logic 470, which generates a template from an image. For yet another embodiment, the template stored in the authentication server 220 may be directly compared with the image received from the client 240.

The policy validation logic 487 determines whether the validation policy of the partner 230 has been fulfilled by the user. As noted above, the policy was included with the challenge, sent by the partner 230 through the client 240. If the validation policy has been fulfilled, i.e. the client 240 has supplied all of the necessary data, the policy validation logic 487 decrypts the challenge, using the decryption logic 490, and returns the decrypted challenge to the client 240. For one embodiment, the decrypted challenge is encrypted with the partner key, prior to being returned.

The decryption logic 490 is used to decrypt communication between the client 240 and the authentication server 220. The decryption logic 490 may use one or more of the partner key(s), the user's private key, as well as the partner's public key to safely communicate with the other parts of this system.

The authentication server 220 may further include partner registration logic 493, to permit partners to register with the system. For one embodiment, enabling the service includes modifying registration/log-on code, to enable the request for third-party authorization, adding fields to the existing user record database, and installing executables that permit the challenge response mechanism. Furthermore, the partner 240 and authentication server 220 may exchange the partner key. In terms of the partner 230 illustrated, the challenge logic 420 and validation logic 440 are added, and the web pages/scripts 410 are updated and/or replaced to interact appropriately with the authentication server 220. For one embodiment, the partner registration logic 493 may be located on separate server (s).

The authentication server 220 may further include client registration logic 496. Client registration logic 496 prompts the user to install the biometric sensor, if that is not yet installed. The client registration logic 496, for one embodiment, further uploads an installation program that permits the client 240 to register their biometric data. The client registration logic 496 further generates an entry in the database for the new user, and generates a public key/private key pair for the user. For one embodiment, the public key is further certified by a certification authority. For one embodiment, the certification authority may be an external certification authority, such as VeriSign. For another embodiment, the certification authority may be an internal certification authority within the authentication server 220.

The client registration logic 496 further includes logic to pass the public key (for one embodiment, certified) and record ID to the client 240, to be passed on to the partner 230. For one embodiment, the client registration logic 496 may be located on a separate server(s).

Note that the partner 230 and the authentication server 220 do not communicate directly. All communication goes through the client 240.

Figure 5:
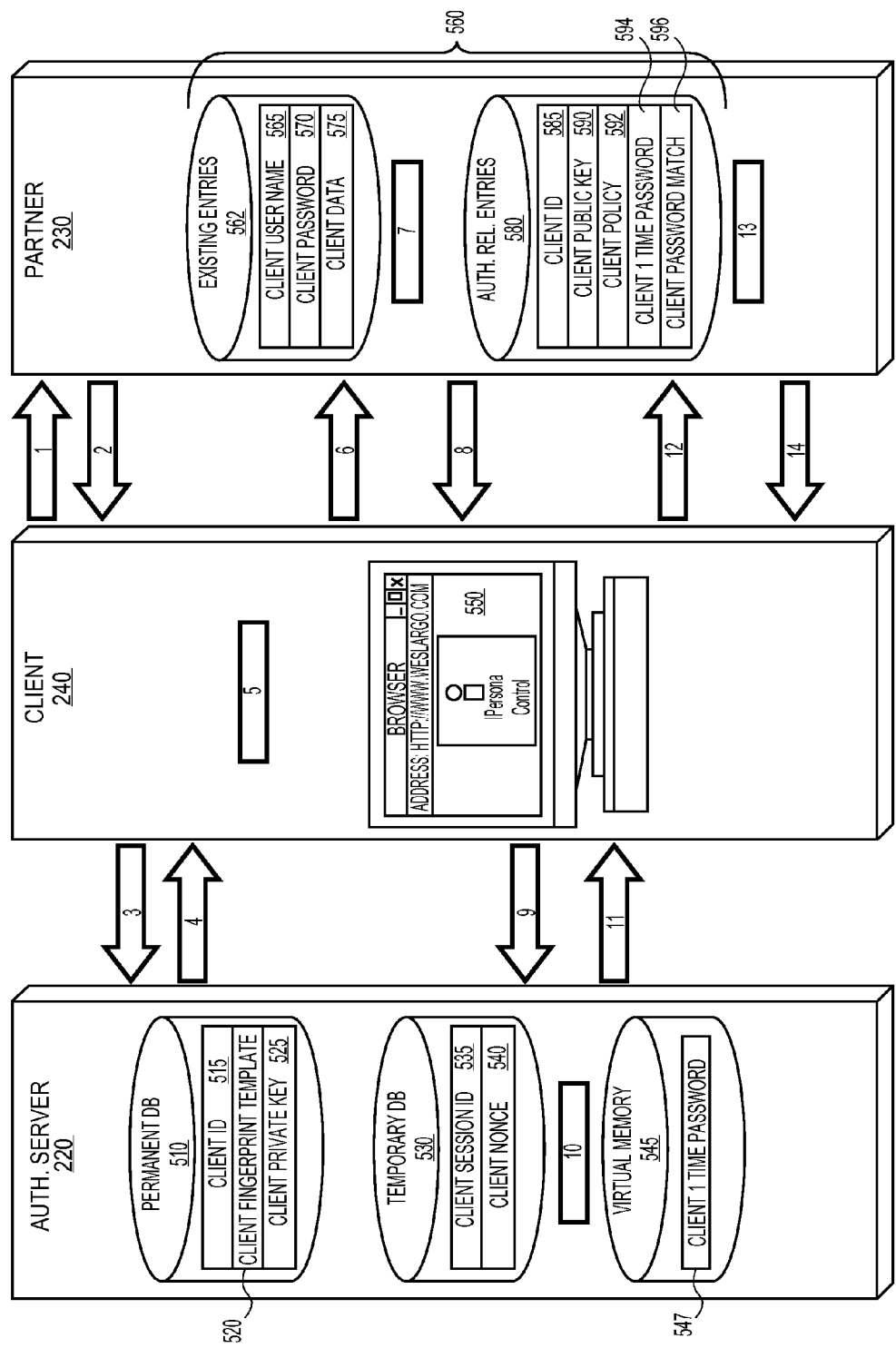
FIG. 5 is a diagram of one embodiment of using the authentication server to access a secure partner site.

FIG. 5 is a diagram of one embodiment of using the authentication server to access a secure partner site. The authentication server 220 includes a database 510 in which information about those clients that are registered with the authentication server 220 are stored. For one embodiment, database 510 includes a client ID, or record ID 515, which identifies the client. For one embodiment, the client ID 515 is randomly generated at the time the client registers with the authentication server 220.

Associated with a client ID 515 is a biometric template 520. The biometric template 520 is captured during registration. For one embodiment, the biometric template 520 may include multiple fingers. For one embodiment, the biometric template 520 is the processed biometric data. For example, for a fingerprint, the biometric template 520 may be a list of minutiae with locations. Alternative template definitions, as is known in the art, may be used. For yet another embodiment, the biometric template 520 may be an actual image of biometric data. In that instance, the authentication server 220 processes the biometric data upon request.

A client private key 525 is further associated with the client ID 515. Upon registration, a public key/private key pair is generated for the client. The public key is distributed, e.g. passed back to the client. However, the private key 525 is not released by the authentication server 220. For one embodiment, only the authentication server 220 performs actions using this private key. For one embodiment, a copy of the public key is also kept.

The authentication server 220 further includes a temporary database 530. An entry in the temporary database 530 is generated whenever a new session is established with a client. The temporary database entry is maintained only for a limited period of time. For one embodiment, whenever a client session is closed, the temporary database entry 530 is destroyed.

The temporary database 530 includes a client session ID 535, which is generated when a client session is started. The temporary database 530 further includes a client nonce 540. As was described above with respect to FIG. 4, the nonce is a security mechanism that prevents replay attacks. The nonce 540 is a temporary mechanism that is used only for a single access.

The client 240 includes a browser 550 that is able to respond to objects. For one embodiment, the browser 550 supports JavaScript or ActiveX controls. This permits the web page to drive actions on the client's system.

The partner site 230 is the site to which the client 240 is attempting to connect. For one embodiment, the partner site 230 is a local smart card. The local smart card is accessed using this authentication mechanism. The smart card has two portions, the portion that provides the challenge, and the locked portion, which is only accessible if the authentication server properly authenticates the user.

The partner site 230 includes a client database 560. The client database 560 includes a number of entries that are present whether or not the authentication server 220 is used. The "existing entries" 562 are supplemented with "third party authentication related entries" 580. The existing entries 562 include a client's user name 565, a client password 570, and other client specific data 575. Depending on the site, this data 575 may include the client's account numbers, account contents, etc.

The third party authentication related entries 580 include the client ID 585. The client ID 585 is the same client ID 515 that was generated by the authentication server 220, and passed through the client 240. The client public key 590, matching the private key 525 stored in the authentication server 220, is also stored.

A client policy 592 may be defined by the partner site 230. The client policy 592 determines what items are necessary for authentication. For example, the policy may specify that a single biometric identifier from the client is sufficient for authentication. For another embodiment, the policy may include one or more of the following: biometric identifier(s), smart card(s), password(s), etc. For example, for an extremely high security level, the policy may require three separate biometric identifiers (e.g. two fingerprints and a retina scan), as well as a smart card, and a password. The partner site 230 determines the level of security associated with client access.

A client one-time password 594 is generated when a client first requests access, and is used for the third party authentication, as will be described below.

The process of logging on to a secure web site, using third party authentication, is described as follows. The process starts when a client 240 requests a login page from the website of the partner server 230 (message 1). This is driven by the client's browser 550.

In response to this request, the website sends login page to present the logon options. (message 2). This process is driven by the web server of the partner server 230. The log-on options may include the user name, password, and/or third-party security login. For one embodiment, the log-on options are displayed using an HTML/JavaScript logon page. For one embodiment, an active script determines whether the client 240 has the third-party authentication control installed, and if so, it initializes the authentication client control. If the authentication client control is not found, the log-on proceeds as normal, e.g., the client returns a user name and password, and logs in. If, however, the authentication client control is found, the process below is followed.

The client 240 initiates a session with the authentication server. (message 3). For one embodiment, the session is initiated via HTTPS, or another secure mechanism. For one embodiment, this process is driven by a client authentication object.

The authentication server sends a nonce to client object (message 4). The nonce, for one embodiment, is a large random number. For one embodiment, the nonce may include certain identification data within the number, such as a time/date stamp or similar data. For one embodiment, the nonce may further include data regarding the IP address of the client 240.

For one embodiment, the client authentication object raises event to indicate that it is ready. The logon page alerts the user that the fingerprint sensor is ready. The user performs the biometric authentication. For one embodiment, the user places the finger on the sensor, to use a fingerprint.

The client-side software obtains the biometric data, and performs feature extraction to generate a template. The client-side software then combines this template with the nonce that came from the authentication server. (block 5). For another embodiment, the client 240 does not perform the feature extraction, but rather combines the nonce with the image obtained.

The client authentication object obtains a client username. For one embodiment, this data is obtained from the HTML page. For one embodiment, this is obtained by the client authentication object raising an event. For one embodiment, if the page does not return this information, the client object may request this information from the user. This data is then sent to the partner server 230. (message 6). For one embodiment, this is sent via an HTTP POST. Note that this data is not sent to the authentication server 220.

In response to receiving this data, the web service 230 generates a challenge, e.g. one-time password, and encrypts it using the public key associated with the username. The web server 230 further obtains the record ID associated with the username (block 7). For one embodiment, this process is driven by the application web server. For one embodiment, the encryption is performed by JavaBean supplied by the authentication system, when the partner 230 registers to accept third party authentication.

The web service sends the record ID associated with the username and the encrypted challenge to the client 230. (message 8). For one embodiment, the web server also sends the policy to the client 230. For one embodiment, if the policy requires some data directly from the client 230, such as a password, this data must first be supplied, prior to receiving the challenge. Thus, there would be an additional exchange, passing the requested password/other authentication data to the partner 230.

After that level of validation occurs, the partner 230 passes the encrypted challenge to the client 230. For another embodiment, the policy may involve additional verification by the third party authentication server 220, such as additional biometric data or a password maintained by the authentication server 220. In that instance, the policy data would be included with the challenge. For one embodiment, the policy is encrypted with the challenge, so the client 240 could not access the policy. This process, for one embodiment, is driven by application web server.

The client object forwards the record ID, encrypted challenge, and if appropriate the policy, to the authentication server. The client object also sends the encrypted biometric template to the authentication server. (message 9).

The authentication server 220 compares the biometric template received from the client 240 against the template associated with the record ID. The authentication server 220 then determines if the policy requires additional data. For example, the policy may require multiple biometric matches to authenticate. The authentication server 220 follows the policy defined by the web server 230, and only declares a match if all the data necessary for a match has been obtained. If a valid match is found, the authentication server 220 decrypts the challenge with the private key 525 associated with that record ID. (block 10).

The authentication server sends the decrypted challenge to the client object. (message 11). For one embodiment, as discussed above, this occurs over a secure channel. For one embodiment, the decrypted challenge is encrypted with the partner key.

The client object passes the challenge on to the web service (message 12). The web service compares challenge received to the challenge sent (block 13). If the challenges match, and all other aspects of the policy have been satisfied, the web service permits the user to access the partner. At this point, the user has been successfully validated.

Figure 6A:
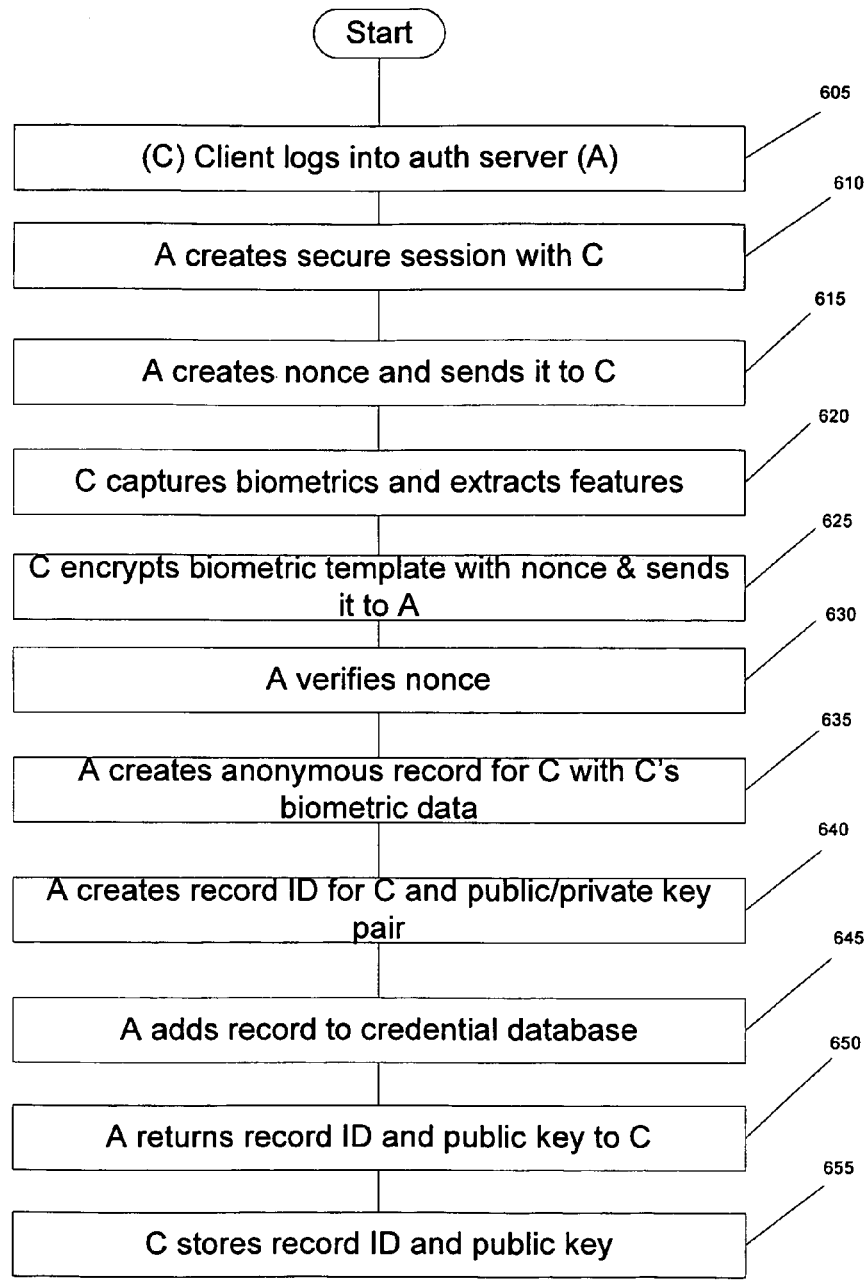
FIG. 6A is a flowchart of one embodiment enabling a client to use the authentication server.

FIG. 6A is a flowchart of one embodiment enabling a client to use the authentication server. The process starts at block 605, when the client creates a connection to the authentication server, in order to create an account. The software to administer the client registration is downloaded to the client.

At block 610, a secure session is created between the client and the server.

At block 615, the authentication server creates a nonce to send to the client. The nonce is used to prevent replay attacks.

At block 620, the client, on instruction from the authentication server, captures biometric data. For one embodiment, multiple sets of biometric data may be captured. For example, if the biometric data is a fingerprint, then multiple fingers may be registered at this point.

The software downloaded to the client may extract the features of the biometric data, and create a biometric template. For a fingerprint, this may be a list of minutiae.

At block 625, the biometric template is encrypted with/combined with the nonce, and returned to the authentication server. For another embodiment, if the client does not perform the biometric feature extraction, the captured biometric is combined with the nonce, and returned at this point.

At block 630, the authentication server extracts the nonce, and verifies it. If the nonce is successfully verified, the biometric template is obtained at this point.

At block 635, an anonymous record is created for the user. The anonymous record includes the user's biometric data.

At block 640, a record ID is generated for the anonymous record. For one embodiment, the record ID is generated randomly. For another embodiment, record IDs may be sequential, or may be generated using some other mechanism.

A public/private key pair is also generated for the client. For one embodiment, the public/private key pair may be a maximum length. For another embodiment, multiple key pairs may be generated, depending on export restrictions. For one embodiment, the public key is certified by a certification authority. The process of certifying a public key is known in the art. For one embodiment, the certification authority may be within the authentication server itself. For another embodiment, an external authentication server may be contacted at this point to certify the public key.

At block 645, an entry is created in the credential database. The entry is indexed by the record ID, and includes the biometric template(s) and the private key(s) of the user.

At block 650, the record ID and public key(s) are returned to the client. If the public key(s) have been certified, the certified key(s) are returned to the client.

At block 655, the client stores the public key(s) and record ID. For one embodiment, the client only stores this data temporarily, until it is passed on to the partner site, as will be described below.

Figure 6B:
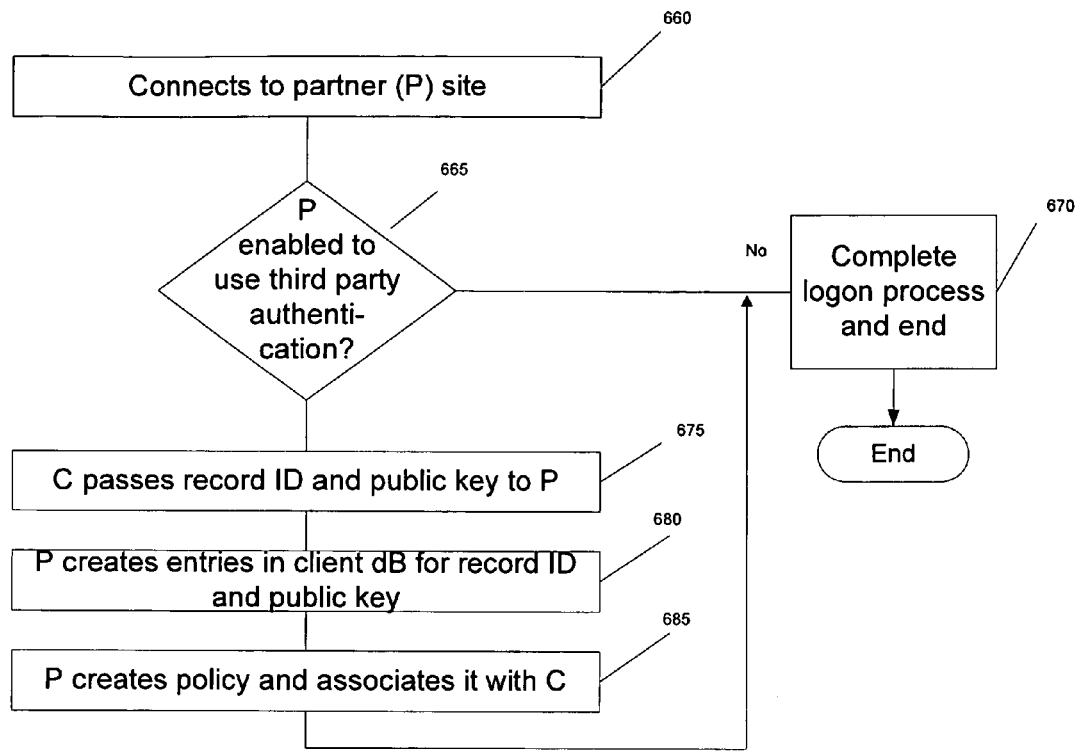
FIG. 6B is a flowchart of one embodiment enabling a client to use the third-party authentication with a particular partner site.

FIG. 6B illustrates the process of adding the credential data to a partner site. The process starts when the client either first logs into the partner site, or first logs into the partner site after receiving the credential data from the authentication server.

At block 660, the client connects to the partner site. If the client already has an account with the partner site, the standard log-in is performed. If this is an initial registration, the partner site at this point collects all relevant information. This corresponds to the "existing entries" portion of the database.

The client also indicates that it has credential data with the third party authentication server.

At block 665, the process determines whether the partner site is enabled to handle such third-party authentication. If the partner site is enabled, the process continues to block 675. Otherwise, at block 670, the log-on process is completed, and the user can continue to use the partner site, as normal.

At block 675, the client passes the record ID and the public key to the partner.

At block 680, the partner creates the additional, third party authorization specific entries in the database. These entries include the client ID (record ID), and client public key.

At block 685, the partner associates a policy with the client entry. The policy determines what authentication(s) take place to permit a connection between the client and the server. The policy may determine the combination of username, biometrics, passwords, and other items such as smart cards that should be used to authenticate the user.

The process then continues to block 670, and the log-on process is completed, and the user can continue to use the partner site. For one embodiment, the login process described above with respect to FIG. 5 is performed here.

Figure 7:
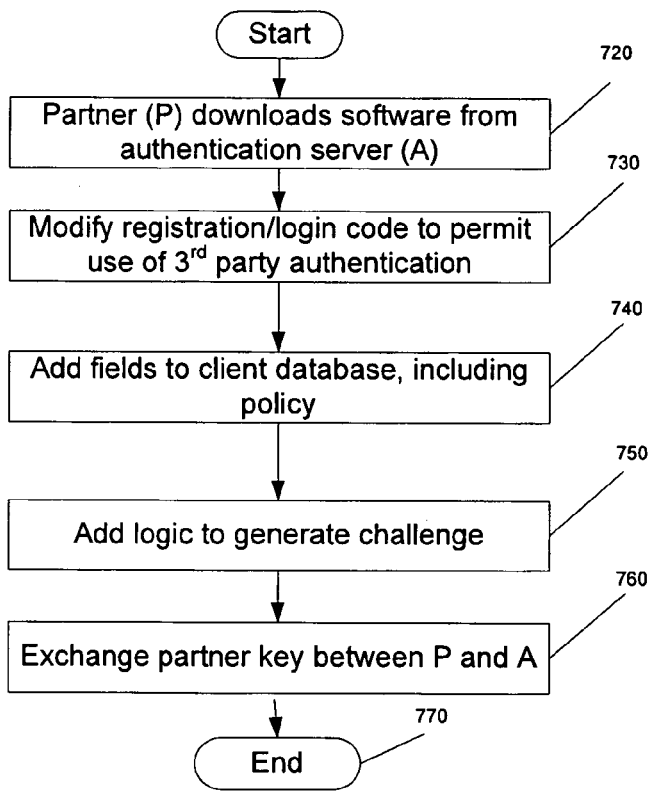
FIG. 7 is a flowchart of one embodiment of setting up a partner site to use the authentication server.

FIG. 7 is a flowchart of one embodiment of setting up a partner site to use the authentication server. The process starts at block 710, when the partner 230 connects to the authentication server 220, or the server that permits the partner 230 to download the appropriate data.

At block 720, the software and/or data for this operation is downloaded to the partner.

At block 730, the registration and login code is modified, to permit the use of third-party authentication. For one embodiment, this alteration is to HTML code. For one embodiment, this alteration includes a script, which detects the presence of a sensor, and permits the user to use the sensor. The script further sends the challenge, and receives the challenge.

At block 740, fields are added to the user database. For one embodiment, the fields include a record ID and a public key, received from the user. Furthermore, the fields may include a policy, which indicates what authentication level is needed for access. For example, the policy may require multiple biometrics, or a biometric and a password to access the partner. This policy, or a pointer to the appropriate policy, is added to the client data field.

For one embodiment, the fields further include an area to save the challenge, which is described above. This permits the easy association of the challenge with the particular user. Thus, when the user returns the record ID (client ID), with the decrypted challenge, the partner knows which client this refers to, and the appropriate challenge.

At block 750, the process adds logic to generate the challenge, and to compare the data returned with the challenge, to determine access.

At block 760, the partner key is exchanged with the authentication server. For one embodiment, the partner key is a symmetric key, or a plurality of symmetric keys. For another embodiment, the partner key is a pair of public/private key sets, one each of the partner and the authentication server, to permit secure communications between the partner and the authentication server.

The process then ends, at block 770. At this point, if a client is enabled to use third party authentication, the partner is able to use that ability, as was described above.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An authentication server comprising:
    a memory, to store instructions for performing authentication; and
    a processor, to execute the instructions, wherein the instructions cause the processor to have:
        a comparison logic to receive, from a client, user authentication data, a record ID for a user, the record ID used to provide pseudonymity to the user, and a one-time key encrypted with a user's public key, the comparison logic to determine whether the user authentication data matches stored data associated with the record ID; and
        a decryption logic to decrypt the one-time key with a private key associated with the record ID, and to return the decrypted one-time key to the client.

2. The server of claim 1, further comprising the instructions to cause the processor to have:
    a nonce generation logic to generate the one-time key, and to send the one-time key to the client, the one-time key to be included with the user authentication data from the client; and
    the comparison logic to verify that the user authentication data includes the one-time key.

3. The server of claim 1, further comprising the instructions to cause the processor to have a client registration logic to register the user, the client registration logic comprising:
    a key generation logic to generate a random public key/private key pair for the user;
    a record ID generation logic to generate a record ID for the user; and
    the client registration logic to associate user authentication data with the private key and the record ID.

4. The server of claim 1, wherein the authentication data is personal data selected from among the following: biometric data, a password, a smart card, and another type of authentication card.

5. The server of claim 1, wherein the client forwards the decrypted one-time key to a third party server, to authenticate the user as owner of the private key.

6. The server of claim 1, further comprising a security mechanism to discard the record ID after returning the one-time key to the user.

7. A method of authenticating a user, the method comprising in an authentication server:
    receiving a record ID for a user, and a one-use nonce which has been encrypted with a user's public key from a client;
    receiving user authentication data from the client;
    determining if the user authentication data matches stored data associated with the record ID; and
    if the user authentication data matches the stored data, decrypting the one-use nonce with a user's private key and returning the decrypted one-use nonce to the client.

8. The method of claim 7, further comprising registering the user with the authentication server, registering comprising:
    receiving a registration authentication data from the user;
    generating a random public key/private key pair for the user, the public key/private key pair including the user's private key and an associated public key;
    generating the record ID for the user; and
    associating the authentication data and the user's private key with the record ID.

9. The method of claim 8, further comprising: sending the record ID and the public key to the user.

10. The method of claim 7, wherein the authentication data is personal data selected from among the following: biometric data, a password, a smart card, and another type of authentication card.

11. The method of claim 7, wherein the client forwards the decrypted one-use nonce to a third party server, thereby authenticating the user as owner of the private key.

12. A method of claim 7, further comprising discarding the record ID after returning the one-use nonce to the user.

13. The method of claim 7, wherein the record ID and the encrypted one-use nonce are further encrypted using a partner key, the method further comprising decrypting the record ID and encrypted one-use nonce using the partner key.

14. The method of claim 13, wherein the partner key is a symmetric key set up during registration of a partner server.

15. The method of claim 14, wherein the partner key is a private key of the authentication server.

16. The method of claim 7, further comprising:
    determining an authentication policy associated with the user; and
    verifying that the authentication policy has been satisfied, prior to permitting access to the authentication server.

17. The method of claim 16, wherein verifying that the authentication policy has been satisfied comprises determining if the authentication server should verify additional data; and if so, requesting additional data from the user prior to generating the one-use nonce.

18. A server computing device comprising:
    a memory, to store instructions for performing authentication; and
    a processor, to execute the instructions, wherein the instructions cause the processor to:

receive a record ID for a user, and a one-use nonce which has been encrypted with a user's public key from a client;

receive user authentication data from the client;

determine if the user authentication data matches stored data associated with the record ID; and if the user authentication data matches the stored data, decrypt the one-use nonce with a user's private key and return the decrypted one-use nonce to the client.

19. The server computing device of claim 18, further comprising the instructions to cause the processor to:

receive a registration authentication data from the user;

generate a random public key/private key pair for the user, the public key/private key pair including the user's private key and an associated public key;

generate the record ID for the user; and associate the authentication data and the user's private key with the record ID.

20. The server computing device of claim 18, wherein the record ID and the encrypted one-use nonce are further encrypted using a partner key, the instructions further to cause the processor to decrypt the record ID and encrypted one-use nonce using the partner key.

* * * * *